(12) United States Patent
Nilsson et al.

(10) Patent No.: US 11,778,488 B2
(45) Date of Patent: Oct. 3, 2023

(54) DETERMINING BEAM SETTINGS FOR BEAM MANAGEMENT

(71) Applicant: Telefonaktiebolaget LM Ericsson (publ), Stockholm (SE)

(72) Inventors: Andreas Nilsson, Gothenburg (SE); Niklas Jaldén, Enköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/094,521

(22) Filed: Jan. 9, 2023

(65) Prior Publication Data
US 2023/0164586 A1 May 25, 2023

Related U.S. Application Data

(63) Continuation of application No. 16/977,725, filed as application No. PCT/EP2018/056702 on Mar. 16, 2018, now Pat. No. 11,553,356.

(51) Int. Cl.
| | |
|---|---|
| *H04W 16/28* | (2009.01) |
| *H04B 7/06* | (2006.01) |
| *H04W 72/044* | (2023.01) |

(52) U.S. Cl.
CPC .......... *H04W 16/28* (2013.01); *H04B 7/0634* (2013.01); *H04W 72/046* (2013.01)

(58) Field of Classification Search
CPC ................ H04W 16/28; H04W 72/046; H04B 7/0634
See application file for complete search history.

(56) References Cited

U.S. PATENT DOCUMENTS

| | | |
|---|---|---|
| 2013/0059619 A1 | 3/2013 | Kim et al. |
| 2015/0341095 A1 | 11/2015 | Yu et al. |

(Continued)

FOREIGN PATENT DOCUMENTS

| | | |
|---|---|---|
| WO | 2015152931 A1 | 10/2015 |
| WO | 2017083514 A1 | 5/2017 |

OTHER PUBLICATIONS

International Search Report and the Written Opinion of the International Searching Authority, issued in corresponding International Application No. PCT/EP2018/056702, dated Dec. 7, 2018, 11 pages.

(Continued)

*Primary Examiner* — Kabir A Timory
(74) *Attorney, Agent, or Firm* — Rothwell, Figg, Ernst & Manbeck, P.C.

(57) ABSTRACT

There is provided mechanisms for determining beam settings for beam management. A method is performed by a first radio transceiver device. The method comprises obtaining information about expected distribution of second radio transceiver devices in a network coverage region of the first radio transceiver device in which the beam management is to be performed. The method comprises determining beam settings for a first set of beams and a second set of beams. The first set of beams and the second set of beams are to be used for the beam management. There are fewer beams in the first set of beams than in the second set of beams. The beams in the first set of beams collectively cover all beams in the second set of beams. The beam settings for the beams in the first set of beams are determined according to the obtained information.

18 Claims, 7 Drawing Sheets

(56) References Cited

U.S. PATENT DOCUMENTS

| | | |
|---|---|---|
| 2018/0262918 A1 | 9/2018 | Zhao et al. |
| 2019/0261287 A1 | 8/2019 | Deenoo et al. |
| 2019/0319686 A1 | 10/2019 | Chen, IV et al. |
| 2019/0342872 A1 | 11/2019 | Rune et al. |
| 2021/0014838 A1* | 1/2021 | Liou .................... H04W 72/23 |

OTHER PUBLICATIONS

Onggosanusi et al. "Modular and High-Resolution Channel State Information and Beam Management for 5G New Radio" IEEE Communications Magazine, vol. 56, No. 3, Mar. 1, 2018, XP055480201, pp. 48-55.

* cited by examiner

DETERMINING BEAM SETTINGS FOR BEAM MANAGEMENT

CROSS REFERENCE TO RELATED APPLICATION(S)

This application is a continuation of U.S. application Ser. No. 16/977,725, filed Sep. 2, 2020, which is a 35 U.S.C. § 371 National Phase Entry Application from PCT/EP2018/056702, filed Mar. 16, 2018, designating the United States. The disclosures of each of the referenced applications are incorporated herein in their entirety by reference.

TECHNICAL FIELD

Embodiments presented herein relate to a method, a radio transceiver device, a computer program, and a computer program product for determining beam settings for beam management.

BACKGROUND

In communications networks, there may be a challenge to obtain good performance and capacity for a given communications protocol, its parameters and the physical environment in which the communications network is deployed.

For example, for future generations of mobile communications networks, frequency bands at many different carrier frequencies could be needed. For example, low such frequency bands could be needed to achieve sufficient network coverage for wireless devices and higher frequency bands (e.g. at millimeter wavelengths (mmW), i.e. near and above 30 GHz) could be needed to reach required network capacity. In general terms, at high frequencies the propagation properties of the radio channel are more challenging and beamforming both at the network node of the network and at the wireless devices might be required to reach a sufficient link budget.

Narrow beam transmission and reception schemes might be needed at such high frequencies to compensate the expected high propagation loss. For a given communication link, a respective beam can be applied at both the network-end (as represented by a network node or its transmission and reception point, TRP) and at the terminal-end (as represented by a terminal device), which typically is referred to as a beam pair link (BPL). One task of the beam management procedure is to discover and maintain beam pair links. A BPL (i.e. both the beam used by the network node and the beam used by the terminal device) is expected to be discovered and monitored by the network using measurements on downlink reference signals, such as channel state information reference signals (CSI-RS), used for beam management.

The reference signals for beam management can be transmitted periodically, semi-persistently or aperiodic (event triggered) and they can be either shared between multiple terminal devices or be device-specific. In order for the terminal device to find a suitable network node beam, the network node transmits the reference signal in different transmission (TX) beams on which the terminal device performs measurements, such as reference signal received power (RSRP), and reports back the N best TX beams (where N can be configured by the network). It is expected that different TX beams are transmitted in different reference signal resources (where each resource is defined in a time/frequency-grid, and that the terminal device reports back N resource indicators, such as CSI-RS resource indicators (CRIs), to inform the network node which TX beams are best. Furthermore, the transmission of the reference signal on a given TX beam can be repeated to allow the terminal device to evaluate a suitable reception (RX) beam.

Further, the beam management might be divided into two phases. For example, a periodic TX beam sweep in which reference signals are transmitted utilizing wider beam can be used to determine a first approximate direction towards each respective terminal device. Then a second (typically aperiodic/or semi-persistent) TX beam sweep in which reference signals are transmitted utilizing narrower beams can be performed based on the determined approximate direction to determine narrower TX beams that later can be used for data and/or control signalling.

FIG. 1 illustrates one example of a beam space 400a with one set of narrow beams 450 (all circles with solid lines) and one set of wide beams 420 (all ellipses with dotted lines). The beams 420, 450 collectively cover a network coverage region 410 (dash-dotted line). In this respect, the illustration in FIG. 1 is somewhat simplified since the narrow beams 450 as well as the wider beams 420 in reality should have a slight overlap in order to avoid network coverage holes in the network coverage region 410. The wide beams 420 could be used in the first phase of the beam management to find approximate direction towards each respective terminal device. The narrow beams 450 within the selected wide beams could be used in a second phase of the beam management in order to find a narrow TX beam to each of the terminal devices. This will reduce the average number of beams resources needed for transmitting the reference signal from 32 (i.e., 1 occurrence of the reference signal in each of the 32 narrow beams) to $4+((1/4)\cdot 8)\cdot 4=12$ beam resources (i.e., 1 occurrence of the reference signal in each of the 4 wide beams plus 1 occurrence of the reference signal in each of the 8 narrow beams within each of the 4 wide beams, where the terminal device has an equal probability of being within network coverage of each of the 4 wide beams).

However, although dividing the beam management into two phases might reduce the number of beams which the terminal devices needs to evaluate, the overhead signalling (e.g. as defined by the number of needed beams resources) might still be too large for some network configurations.

Hence, there is still a need for improved beam management procedures.

SUMMARY

An object of embodiments herein is to provide determining of beam settings that can be used for efficient beam management.

According to a first aspect there is presented a method for determining beam settings for beam management. The method is performed by a first radio transceiver device. The method comprises obtaining information about expected distribution of second radio transceiver devices in a network coverage region of the first radio transceiver device in which the beam management is to be performed. The method comprises determining beam settings for a first set of beams and a second set of beams. The first set of beams and the second set of beams are to be used for the beam management. There are fewer beams in the first set of beams than in the second set of beams. The beams in the first set of beams collectively cover all beams in the second set of beams. The beam settings for the beams in the first set of beams are determined according to the obtained information.

According to a second aspect there is a radio transceiver device for determining beam settings for beam management. The radio transceiver device comprises processing circuitry. The processing circuitry is configured to cause the radio transceiver device to obtain information about expected distribution of second radio transceiver devices in a network coverage region of the first radio transceiver device in which the beam management is to be performed. The processing circuitry is configured to cause the radio transceiver device to determine beam settings for a first set of beams and a second set of beams. The first set of beams and the second set of beams are to be used for the beam management. There are fewer beams in the first set of beams than in the second set of beams. The beams in the first set of beams collectively cover all beams in the second set of beams. The beam settings for the beams in the first set of beams are determined according to the obtained information.

According to a third aspect there is presented a radio transceiver device for determining beam settings for beam management. The radio transceiver device comprises an obtain module configured to obtain information about expected distribution of second radio transceiver devices in a network coverage region of the first radio transceiver device in which the beam management is to be performed. The radio transceiver device comprises a determine module configured to determine beam settings for a first set of beams and a second set of beams. The first set of beams and the second set of beams are to be used for the beam management. There are fewer beams in the first set of beams than in the second set of beams. The beams in the first set of beams collectively cover all beams in the second set of beams. The beam settings for the beams in the first set of beams are determined according to the obtained information.

Advantageously this provides efficient determining of beam settings.

Advantageously the determined beam settings can be used for efficient beam management.

Advantageously this enables the overhead signaling for beam management procedures to be reduced.

Advantageously, the reduction in overhead signaling may in turn increase the capacity of payload in the network, or be used for idle time and hence energy saving.

According to a fourth aspect there is presented a computer program for determining beam settings for beam management, the computer program comprising computer program code which, when run on a radio transceiver device, causes the radio transceiver device to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 2:
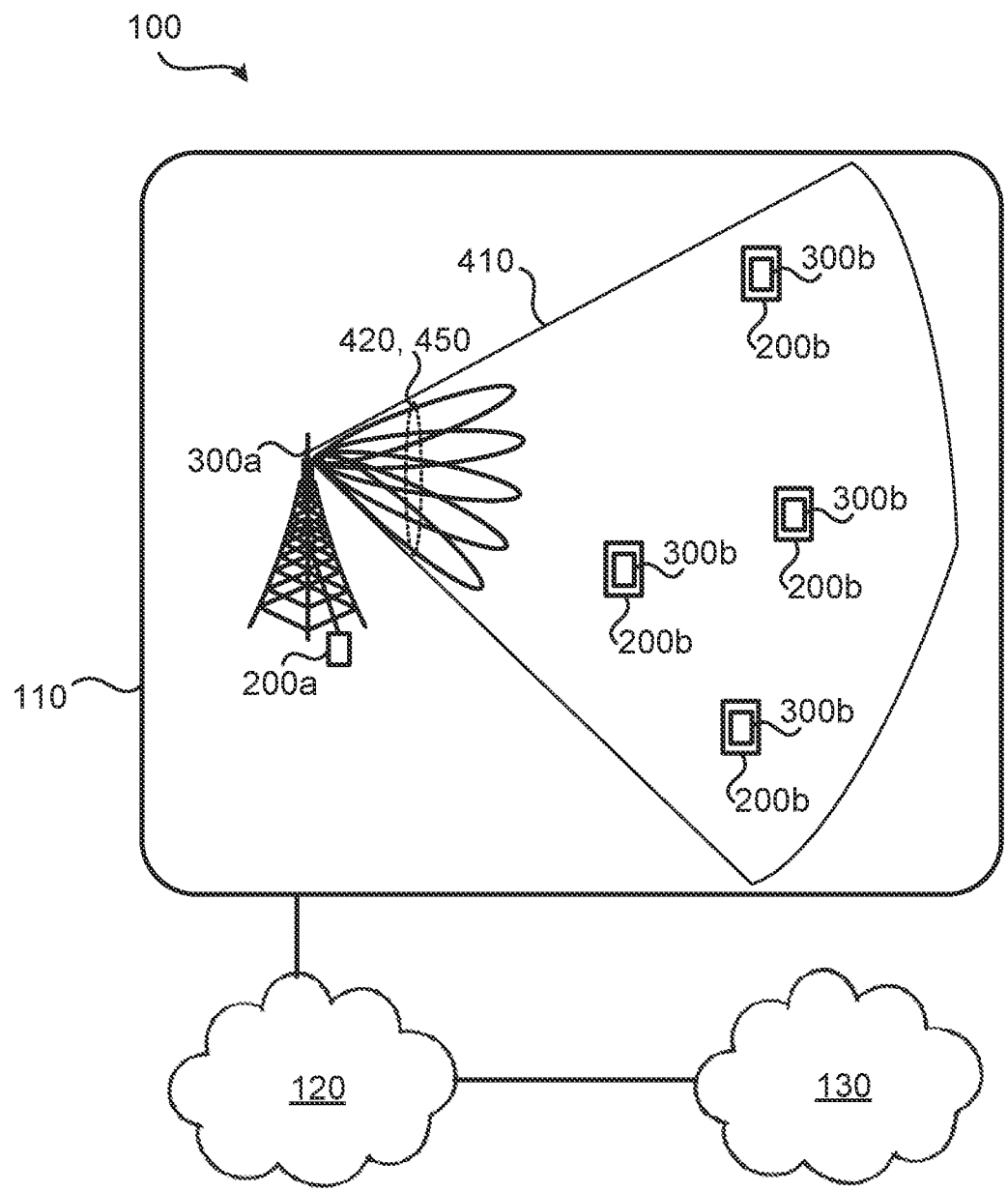
FIG. 2 is a schematic diagram illustrating a communications network according to embodiments.

FIG. 2 is a schematic diagram illustrating a communications network 100 where embodiments presented herein can be applied. The communications network 100 could be a third generation (3G) telecommunications network, a fourth generation (4G) telecommunications network, or a fifth (5G) telecommunications network and support any 3GPP telecommunications standard, where applicable.

The communications network 100 comprises a radio transceiver device 200a configured to, via TRP 300a, provide network access to radio transceiver devices 200b, comprising TRP 300b, in a radio access network 110. In some embodiments each radio transceiver device 200b is part of, integrated with, or collocated with, a terminal device and radio transceiver device 200a is part of, integrated with, or collocated with, a network node.

Examples of network nodes are radio access network nodes, radio base stations, base transceiver stations, Node Bs, evolved Node Bs, g Node Bs, access points, access nodes, and backhaul nodes. Examples of terminal devices are wireless devices, mobile stations, mobile phones, handsets, wireless local loop phones, user equipment (UE), smartphones, laptop computers, tablet computers, network equipped sensors, network equipped vehicles, and so-called Internet of Things devices.

Radio access network 110 is operatively connected to a core network 120. The core network 120 is in turn operatively connected to a service network 130, such as the Internet. Radio transceiver device 200b is thereby, via radio transceiver device 200a, enabled to access services of, and exchange data with, the service network 130.

The herein disclosed embodiments can be applied at a radio transceiver device implemented both as a radio access network node and a terminal device, or even as a radio transceiver device implemented as a backhauling node or a sidelink node. Thus, although radio transceiver device 200a in at least some of the herein disclosed embodiments is described as being a network node and radio transceiver device 200b is described as being a terminal device, the functionality of the herein disclosed radio transceiver device 200a could equally be implemented in a terminal device, and vice versa for radio transceiver device 200b. For ease of notation, radio transceiver device 200a will hereinafter be denoted first radio transceiver device, and radio transceiver devices 200b will hereinafter be denoted second radio transceiver device 200b.

The first radio transceiver device 200a is, via TRP 300a, configured to communicate with radio transceiver device 200b in beams 420, 450. The beams collectively cover a network coverage region 410 of the first radio transceiver device 200a. The first radio transceiver device 200a could be configured to communicate using a variety of beams having different shapes and widths, herein generally referred to as having different beam patterns. It is envisioned that also the second radio transceiver device 200b might, via TRP 300b, be configured to communicate with radio transceiver device 200a in beams.

As disclosed above a beam management procedure might be performed in order to find a BPL for radio transceiver device 200a and radio transceiver device 200b. As further disclosed above, the beam management procedure disclosed above might result in some issues.

Figure 1:
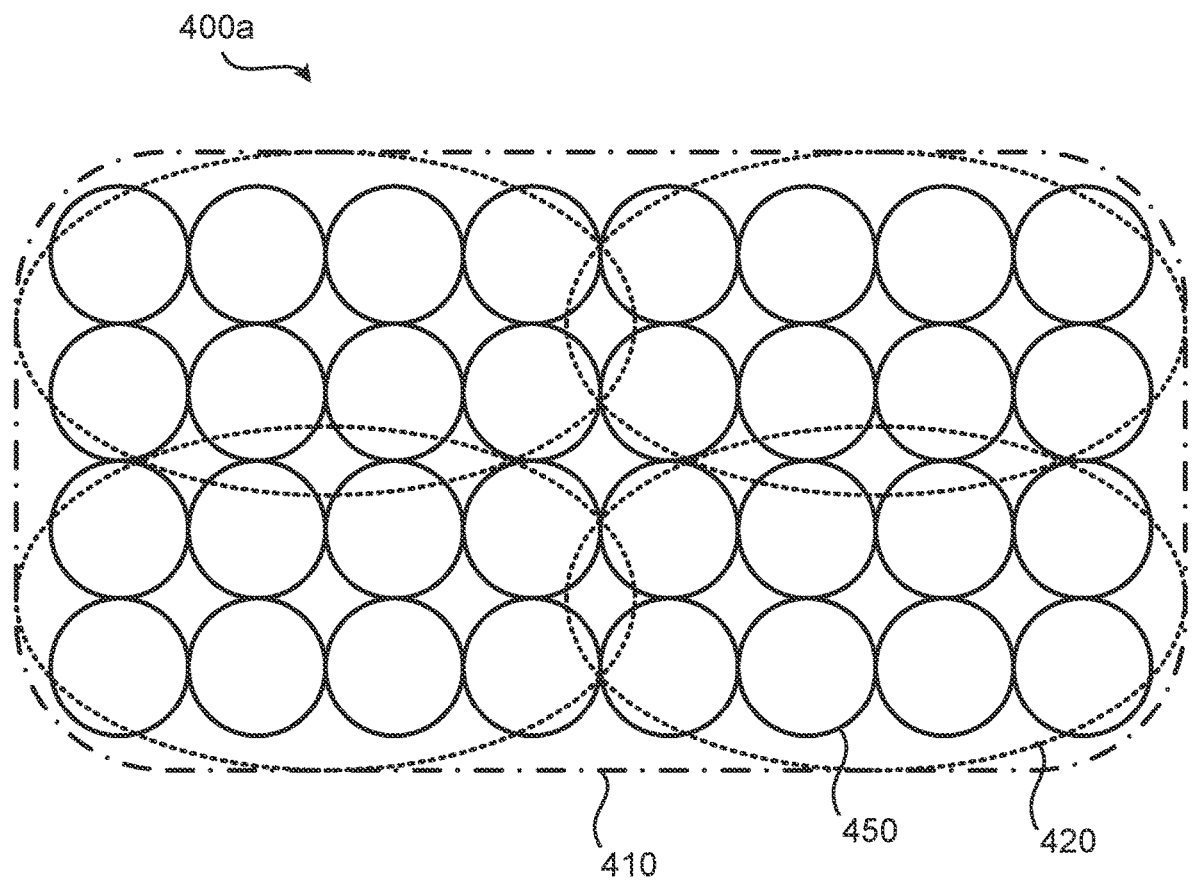
FIG. 1 is a schematic illustration of a beam space.

In further detail, with reference to FIG. 1, as the distribution of served second radio transceiver devices 200b is typically not homogenously spread within the network coverage region 410 of the first radio transceiver device 200a, using the same beam widths for all wide beams of the first phase of the beam management procedure might not be optimal with respect to the total overhead required for the entire beam management procedure. For example, if one area of the network coverage region 410 is more densely populated with served second radio transceiver devices 200b compared to other areas of the network coverage region 410, it could be beneficial to, in such directions, apply narrower beams during the first phase of the beam management procedure. In this way, fewer beams on average need to be evaluated during the second phase of the beam management procedure.

The embodiments disclosed herein therefore relate to mechanisms for determining beam settings for beam management. In order to obtain such mechanisms there is provided a radio transceiver device 200a, a method performed by the radio transceiver device 200a, a computer program product comprising code, for example in the form of a computer program, that when run on a radio transceiver device 200a, causes the radio transceiver device 200a to perform the method.

Figure 3:
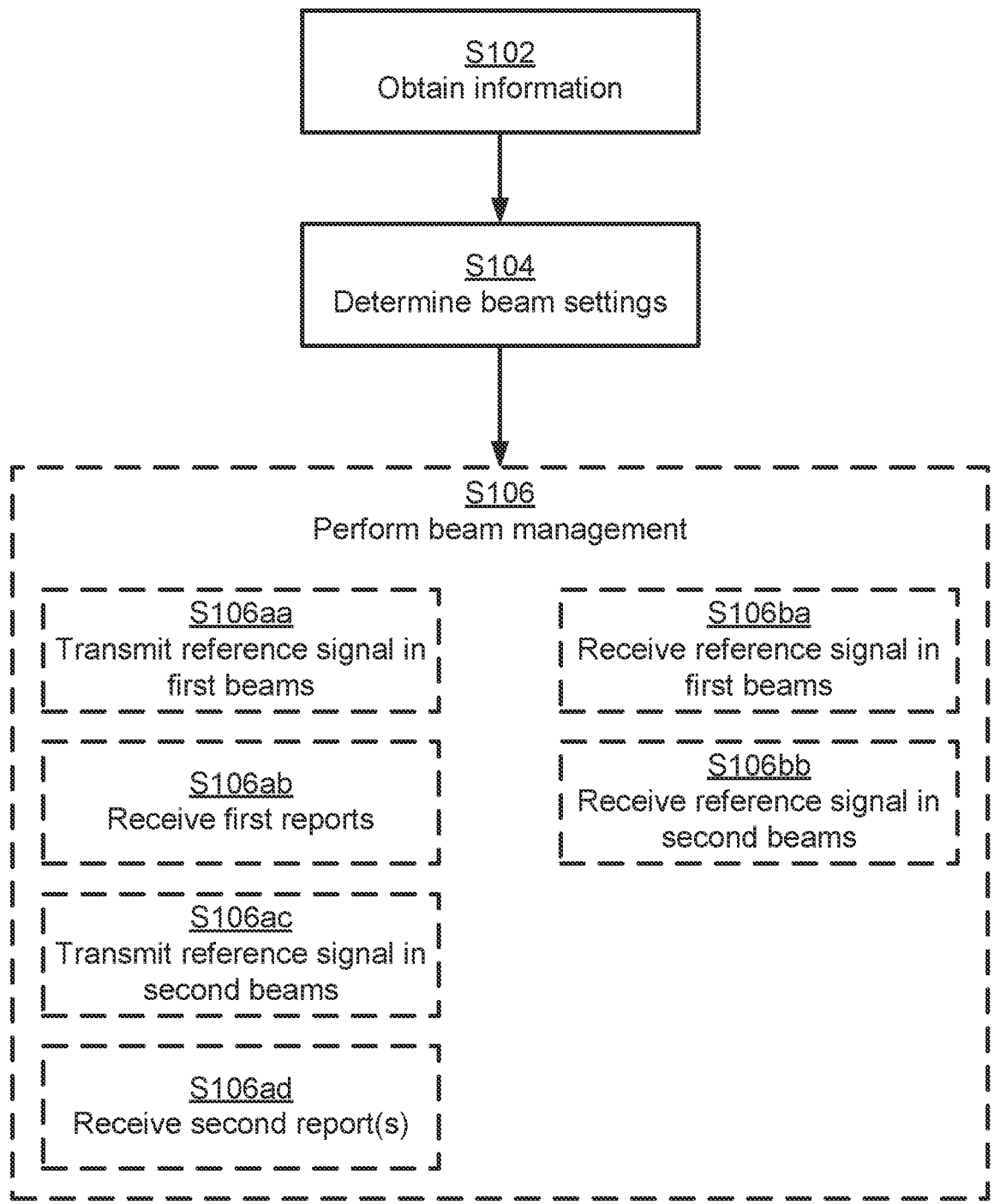
FIG. 3 is a flowchart of methods according to embodiments.

FIG. 3 is a flowchart illustrating embodiments of methods for determining beam settings for beam management. The methods are performed by the radio transceiver device 200a. The methods are advantageously provided as computer programs 1120. Continued reference is made to FIG. 2.

The beam settings for at least some of the beams that are to be used during the actual beam management are based on information obtained by the first radio transceiver device 200a. Hence, the first radio transceiver device 200a is configured to perform step S102:

S102: The first radio transceiver device 200a obtains information about expected distribution of the second radio transceiver devices 200b in the network coverage region 410 of the first radio transceiver device 200a in which the beam management is to be performed.

The first radio transceiver device 200a then determines beam settings. Hence, the first radio transceiver device 200a is configured to perform step S104:

S104: The first radio transceiver device 200a determines beam settings for a first set of beams 420 and a second set of beams 450. The first set of beams 420 and the second set of beams 450 are to be used for the beam management.

The beam settings are determined such that there are fewer beams in the first set of beams 420 than in the second set of beams 450. This implies that there are at least some beams in the first set of beams 420 that are wider than the beams in the second set of beams 450.

Further, the beam settings are determined such that the beams in the first set of beams 420 collectively cover all beams in the second set of beams 450. This does not exclude the possibility that there are additional beams that are not used during the beam management and that such additional beams thus are not collectively covered by the beams in the first set of beams 420

Further, the beam settings for the beams in the first set of beams 420 are determined according to the obtained information.

Embodiments relating to further details of determining beam settings for beam management as performed by the radio transceiver device 200a will now be disclosed.

In some aspects the first radio transceiver device 200a obtains information regarding the possible beam widths that can be generated. This information might include all from the widest possible beam width to the narrowest possible beam width that can be generated. In general terms, this information is fundamentally determined by the configuration and hardware limitations of the TRP 300a.

In some aspects the first radio transceiver device 200a obtains information regarding the angular area (sector size, horizontal and azimuth) that should be covered by the first radio transceiver device 200a. The angular area thus corresponds to the network coverage region 410 of the first radio transceiver device 200a in which the beam management is to be performed. This information is typically defined at deployment through cell planning or similar practice. The network coverage region 410 might, for example, be changed at certain occasions when, for example, densifying the network 100, or if the network coverage region 410 for any other reason should be altered. Hence, according to an embodiment the beam settings for the beams in the first set of beams 420 are determined such that the beams in the second set of beams 450 collectively cover the network coverage region 410. Further, according to an embodiment, the beam settings for the beams in the first set of beams 420 are determined based on the angular extension of the network coverage region 410.

In some aspects the first radio transceiver device 200a obtains information regarding expected user density and traffic density in different parts of the network coverage region 410. That is, according to an embodiment the obtained information further comprises information about expected traffic distribution of the second radio transceiver devices 200b in the network coverage region 410.

There could be different ways to determine the beam widths of the beams in the first set of beams 420.

In some aspects the parts of the network coverage region 410 with a comparatively high number of second radio transceiver devices 200b are covered by beams in the first set of beams 420 having more narrower beam widths than those beams in the first set of beams 420 covering those parts of the network coverage region 410 with a comparatively low number of second radio transceiver devices 200b. Particularly, according to an embodiment the beam settings for the beams in the first set of beams 420 are determined such that the beams in the first set of beams 420 are more narrow in those parts of the network coverage region 410 having higher expected distribution of second radio transceiver devices 200b than in those parts of the network coverage region 410 having lower expected distribution of second radio transceiver devices 200b.

In some aspects the beam settings for the beams in the first set of beams 420 are determined with an aim to minimize the overhead signalling needed for the beam management. Particularly, according to an embodiment the beam settings for the beams in the first set of beams 420 are determined according to an optimization criterion. The optimization criterion pertains to minimal overhead signalling for the beam management.

In some aspects the beam settings for the first set of beams 420 are determined such that the probability that a second radio transceiver device 200b has its optimal narrow beam (i.e., a beam taken from the second set of beams 450) in either one of them is equal. That is, according to an embodiment the beam settings for the beams in the first set of beams 420 are determined such that, according to the expected distribution of the second radio transceiver devices 200b, all beams in the first set of beams 420 have equal expected distribution of the second radio transceiver devices 200b. This means that beams from the first set of beams 420 covering parts of the network coverage region 410 with high expected user density and traffic density will be associated with as many beams from the second set of beams 450 as those beams from the first set of beams 420 covering parts of the network coverage region 410 with low expected user density and traffic density.

In some aspects the path gain is also considered when determining the beam settings for the first set of beams 420. Hence, according to an embodiment the beam settings for the beams in the first set of beams 420 are determined based on path gain information of the second radio transceiver devices 200b. By taking the path gain into account the setting for the first set of beams 420 can be determined to avoid network coverage loss.

One way to obtain the information regarding expected user density and traffic density is to gather statistics over a period of time, and evaluate which parts of the the network coverage region 410 that has low expected user density and traffic density and which parts have high expected user density and traffic density. The statistics can be stored in a database to which the first radio transceiver device 200a has access. Hence, according to an embodiment the expected distribution of the second radio transceiver devices 200b in the network coverage region 410 is determined according to collected statistics.

There could be different ways to collect the statistics. According to an embodiment the statistics have been collected during previous beam management as performed by the first radio transceiver device 200a. According to another embodiment the statistics have been collected during previous communications of data and/or control signal between the first radio transceiver device 200a and the second radio transceiver devices 200b.

There could be different types of statistics that are collected in order to obtain the information regarding expected user density and traffic density. According to an embodiment the statistics pertain to location information of the second radio transceiver devices 200b in the network coverage region 410. The location information might be defined by those beams having been used for communicating at least one of data and control signals with the second radio transceiver devices 200b in the network coverage region 410.

One way to obtain the statistics is to log the average time each of the narrow beams (i.e., the beams in the second set of beams 450) are used for data transmission. Particularly, according to an embodiment the statistics are collected by logging information about with how many second radio transceiver devices 200b each of the beams in the second set of beams 450 have been used for communicating at least one of data and control signalling.

Another way to obtain the information regarding expected user density and traffic density is to consider the scenario and the deployment. Particularly, according to an embodiment the information about expected distribution of the second radio transceiver devices 200b (and, optionally, the information about expected traffic distribution of the second radio transceiver devices 200b) is based on at least one of deployment information of the first radio transceiver device 200a and infrastructure information of the infrastructure in which the first radio transceiver device 200a is deployed. For example, in the illustrative example of FIG. 1, if the upper half of the beam space points towards the sky whereas the lower half of the beam space points towards the ground, the expected user density and traffic density is most likely lower in the upper part than in the lower part. It could also be that a building is covering a certain part of the beam space and most of the traffic in the network coverage region 410 is expected to come from second radio transceiver devices 200b inside that building. In such scenarios the first set of beams 420 should be determined such as beams with narrower beam widths can be used in those directions with high expected user density and traffic density. Information of building databases can be obtained by supplying map information when deploying (possibly updating sometimes) or using cameras or other tools for assessing the view of structures in front of the TRP 300a of the first radio transceiver device 200a.

During the beam management, the first set of beams 420 should be used prior to the second set of beams 450. That is, the first set of beams 420 might be used during the first phase of a beam management procedure whereas the second set of beams 450 might be used during a second (optional) phase of the beam management procedure (when needed).

There could be different types of beam management procedures. According to an embodiment, the first set of beams 420 are to be used for periodic beam management and the second set of beams 450 are to be used for aperiodic beam management. That is, the periodic beam management is achieved by performing the first phase of a beam management procedure and the aperiodic beam management is achieved by performing the second phase of a beam management procedure (when needed). The periodic beam management might be associated with long-term beam management and the aperiodic beam management might be associated with short-term beam management. In this respect, the aperiodic beam management might be performed more often (i.e., within shorter time intervals) than the periodic beam management.

Further, the first set of beams 420 can be used to determine a first approximate direction towards each respective second radio transceiver device 200b and the second set of beams 450 can be used to find a more exact direction towards each respective second radio transceiver device 200b and thus be used for data and/or control signalling.

Parallel reference will now be made to FIGS. 4, 5, 6, and 7 illustrating examples of beams spaces.

Figure 4:
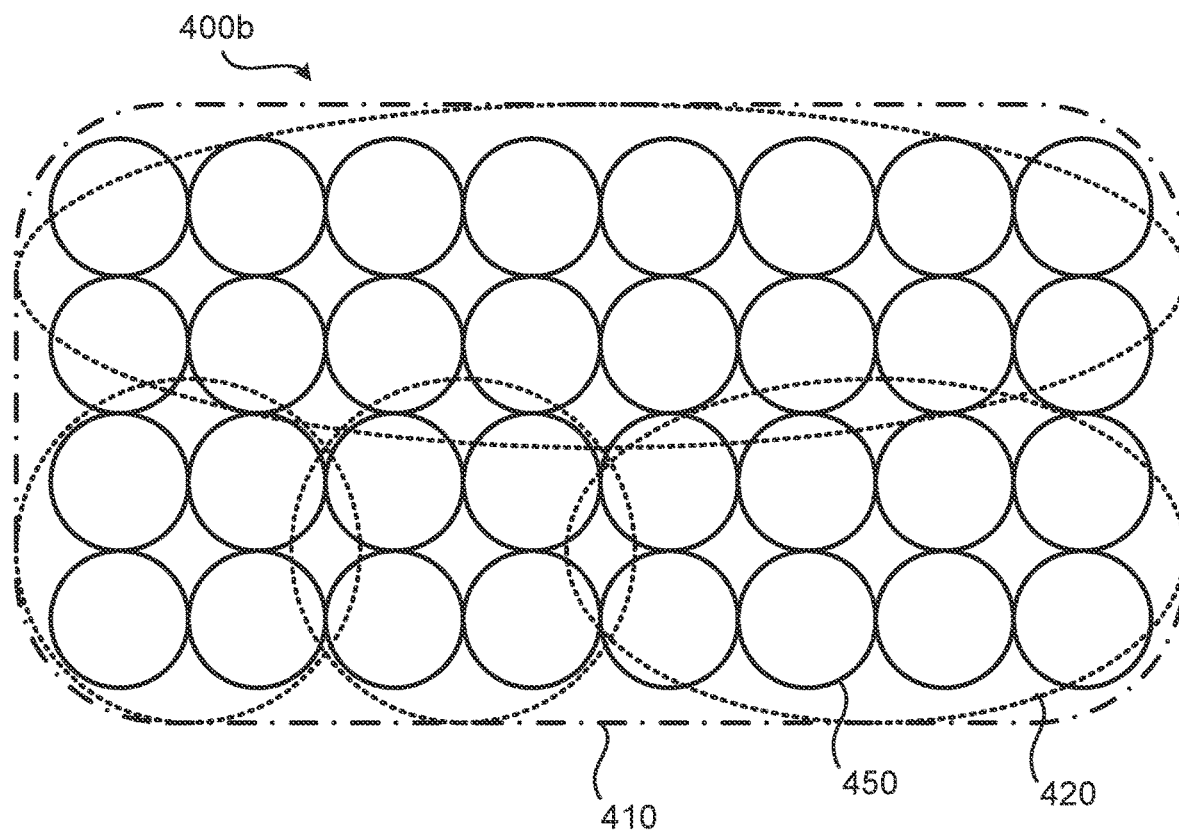
FIGS. 4, 5, 6 and 7 are schematic illustrations of beam spaces according to embodiments.

FIG. 4 illustrates one example of a beam space 400b with a first set of beams 420 (all ellipses and circles with dotted lines) and one second set of beams 450 (all circles with solid lines). The beams 420, 450 collectively cover a network coverage region 410 (dash-dotted line). In this example, low average traffic load (for example low average number of served second radio transceiver devices 200b per day) has been determined in the upper half of the beam space 400a, and hence the beam settings for the first set of beams 420 have been determined such that only one single wide beam is used to cover this part of the network coverage region 410. Meanwhile, very high traffic load is determined in the lower left part of the beam space 400b, and hence the beam settings for the first set of beams 420 have been determined such that beams with comparably narrow beam width are used in this part of the network coverage region 410.

When a second radio transceiver device 200b is detected in the large upper wide beam 420, a total of 16 narrow beams 450 need to be evaluated during the second phase of the beam management procedure in order for the best narrow beam to be found. Further, if the second radio transceiver device 200b instead is located in one of the narrow beams 450 in the lower left corner only a total of 4 narrow beams 450 need to be evaluated during the second phase of the beam management procedure. Further, if the second radio transceiver device 200b instead is located in the medium wide beam 420 in the right lower corner, a total of 8 narrow beams 450 need to be evaluated during the second phase of the beam management procedure.

Thus, if the majority of the second radio transceiver devices 200b will be located in the lower left corner of the beam space 400b, while very few second radio transceiver devices 200b are located in the upper half of the beam space 400b, less overhead signaling during the second phase of the beam management procedure is required compared to the example in FIG. 1 (and hence also reduce the combined overhead for both beam management procedures). Assume for illustrative purposes that the signaling overhead cost of transmitting one beam is defined by one "beam resource". Assume further for illustrative purposes that the probability of a given second radio transceiver devices 200b being located in the upper wide beam 420 is 1/6, that the probability of the given second radio transceiver devices 200b being located in each of the narrow lower left beams 420 is 2/6 each, and that the probability of the given second radio transceiver devices 200b being located in the middle lower right beam 420 is 1/6. Then, in order to find the best narrow beam 450, 4 beam resources are needed for the first phase of the beam management procedure (one for each wide beam 450), and on average $2/6 \cdot 4 + 2/6 \cdot 4 + 1/6 \cdot 8 + 1/6 \cdot 16$ beam resources are needed for the second phase of the beam management procedure. Hence, the total average number of beam resources needed in order for the best narrow beam 450 to be found is $4 + 2/6 \cdot 4 + 2/6 \cdot 4 + 1/6 \cdot 8 + 1/6 \cdot 16 = 10.67$. In comparison, if equal sized coarse beams would be used in the first set of beams, as indicated in FIG. 1, an average of 16 beam resources would have been needed.

Figure 5:
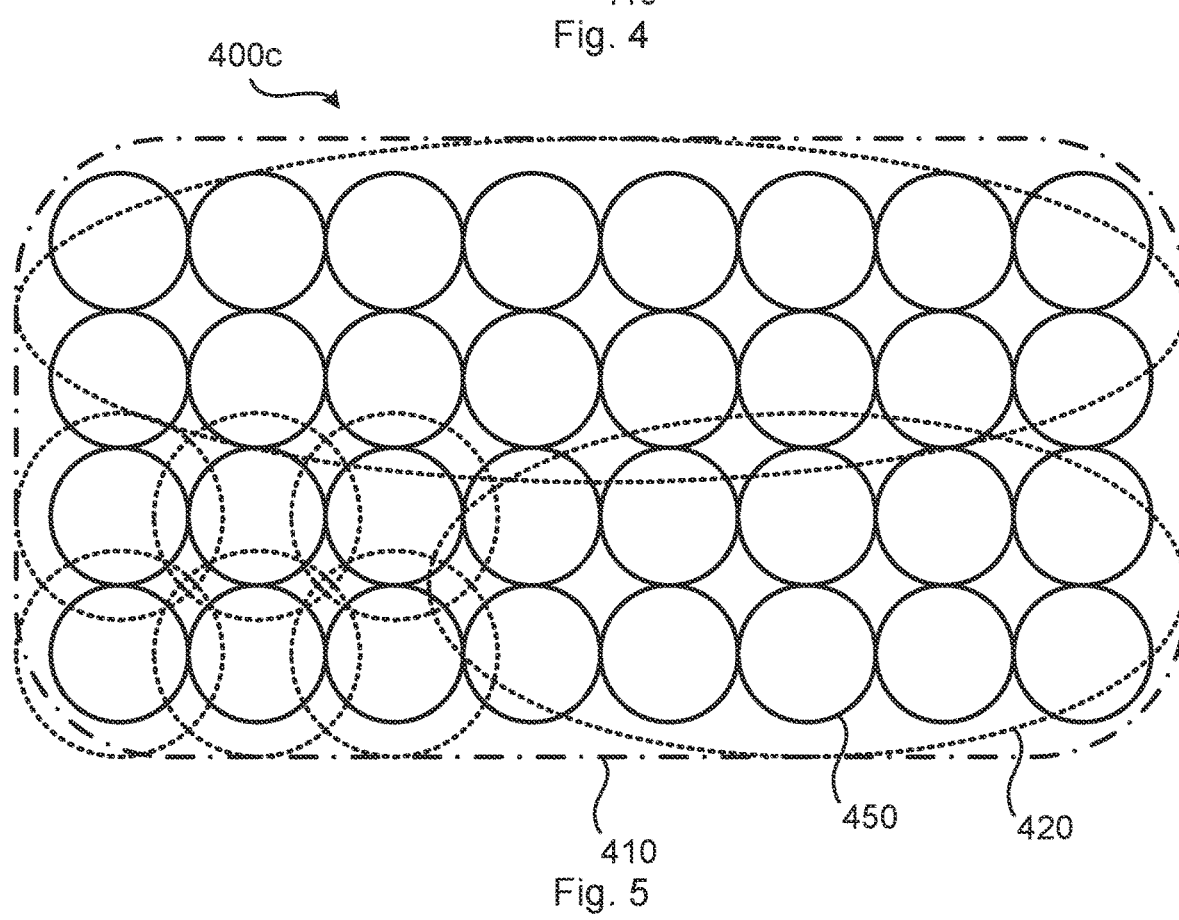

FIG. 5 illustrates another example of a beam space 400c with a first set of beams 420 (all ellipses and circles with dotted lines) and one second set of beams 450 (all circles with solid lines). The beams 420, 450 collectively cover a network coverage region 410 (dash-dotted line). In this example the first set of beams 420 has 8 beams. FIG. 5 is an example of an embodiment where at least one, but less than all, of the beams in the first set of beams 420 covers only a single beam in the second set of beams 450. In this example most of the traffic is expected be located in the lower left corner of the beam space 400c, whereas least amount of traffic is expected in the upper half of the beam space 400c. In the lower left corner the beam width of 6 beams of the first set of beams 420 is just slightly larger (or even of the same size) as the beams of the second set of beams 450. That is, in the lower left corner there is a one-to-one correspondence between the beams of the first set of beams 420 and the beams of the second set of beams 450. Hence, whenever one of these 6 beams of the first set of beams 420 is determined to be the best during the first phase of the beam management procedure, there is no need to perform the second phase of the beam management procedure to find the best beam in the second set of beams 420. In case most of the traffic will be located in those directions, this will reduce the overhead signaling for the overall beam management.

Figure 6:
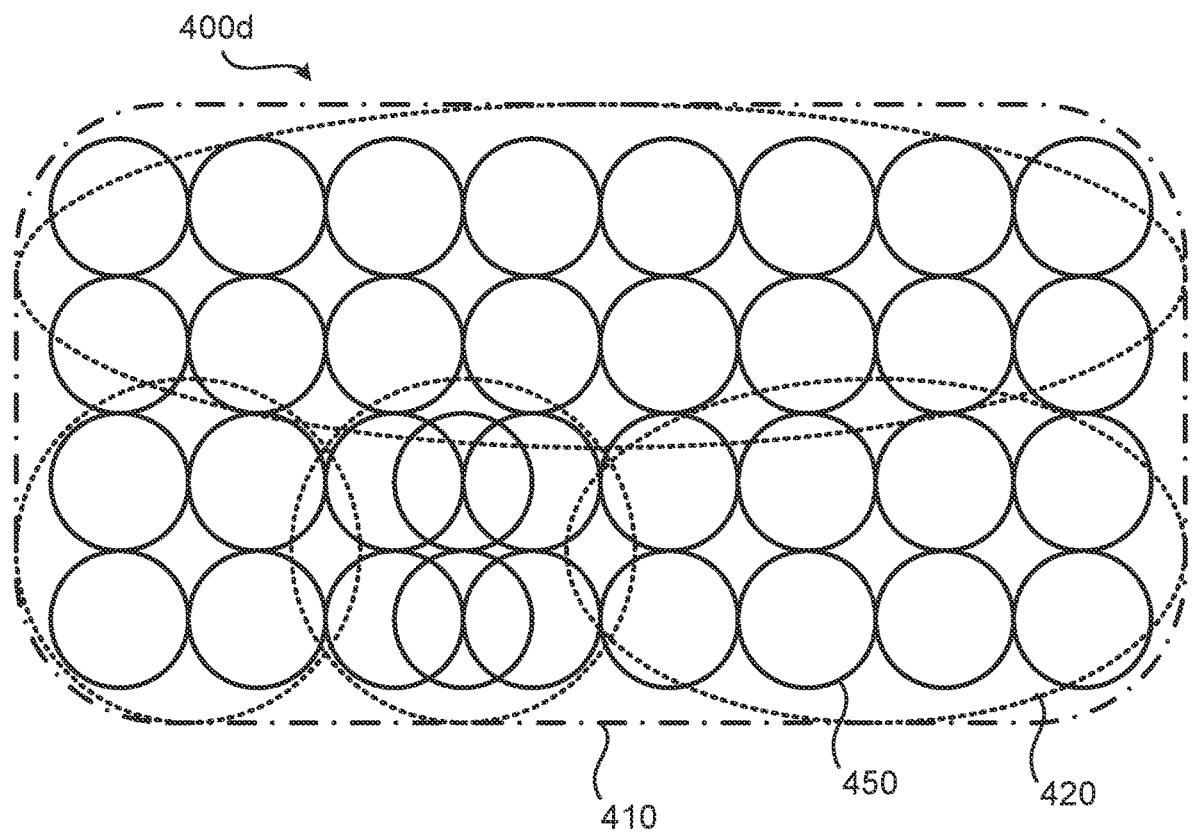

FIG. 6 illustrates yet another example of a beam space 400d with a first set of beams 420 (all ellipses and circles with dotted lines) and one second set of beams 450 (all circles with solid lines). The beams 420, 450 collectively cover a network coverage region 410 (dash-dotted line). FIG. 6 is an example of an embodiment where two beams in the first set of beams 420 having same beam width each covers a respective subset of the beams in the second set of beams 450, and where the respective subsets have mutually different number of beams. In this example the first set of beams 420 are distributed as in the beam space 400b of FIG. 4, but the second set of beams 450 are distributed differently. In more detail, in the wide beam 420 in the lower left corner there are 4 narrow beams 450, whereas in the wide beam 420 next to the lower left corner (of same beam width as the wide beam 420 in the lower left corner) there are 6 narrow beams 450. Thus, the narrow beams are distributed in a finer granularity, which allows for oversampling. Such oversampling may increase the received beamforming gain, and hence the individual link budget between the first radio transceiver device 200a and the second radio transceiver device 200b. In this case, there is a tradeoff between the number of beam resources spent and the resulting link budget (antenna gain) used for data and/or control signalling. Using the same probabilities as in the calculation example in FIG. 4, the average beam resource utilization is $4 + 2/6 \cdot 4 + 2/6 \cdot 6 + 1/6 \cdot 8 + 1/6 \cdot 16 = 11.33$, which is still less than the example in FIG. 1 and results in a better link performance (with the assumed distribution of second radio transceiver devices 200b in FIG. 4).

Figure 7:
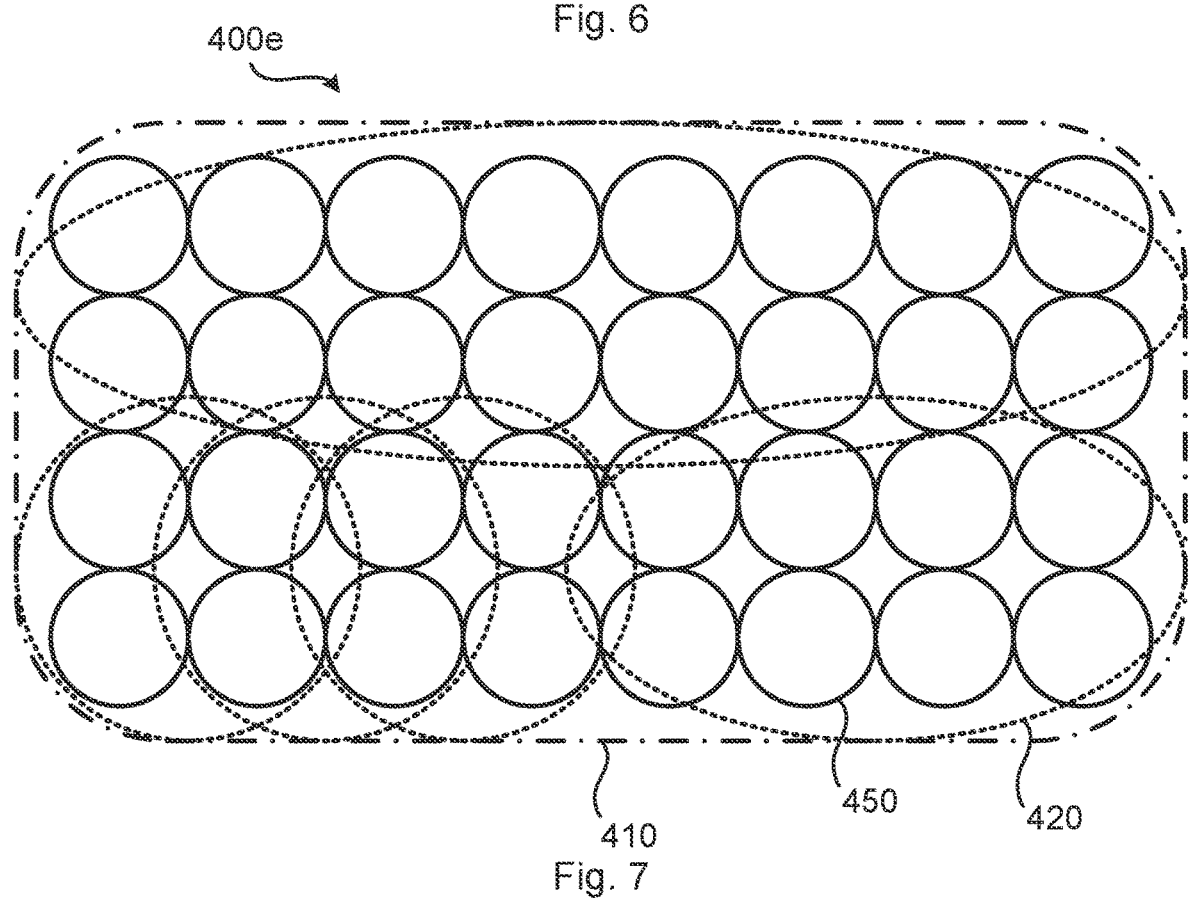

FIG. 7 illustrates yet another example of a beam space 400e with a first set of beams 420 (all ellipses and circles with dotted lines) and one second set of beams 450 (all circles with solid lines). The beams 420, 450 collectively cover a network coverage region 410 (dash-dotted line). FIG. 7 is an example of an embodiment where at least two of the beams in the first set of beams 420 cover one common beam in the second set of beams 450. In this example also the distribution of the beams in the angular domain depends on the distribution of the second radio transceiver devices 200b. For example in angular directions with many second radio transceiver devices 200b the wide beams 420 are more densely spaced compared to angular directions with lower density of second radio transceiver devices 200b. In the beam space 400e of FIG. 7 there are 3 wide beams 420 of equal size in the lower left that partly overlap with each other and thus some of the narrow beams 450 are covered by two wide beams 420.

In some aspects the first radio transceiver device 200a performs the actual beam management procedure. Particularly, according to an embodiment the first radio transceiver device 200a is configured to perform (optional) step S106:

S106: The first radio transceiver device 200a performs the beam management.

Embodiments relating to different ways for the first radio transceiver device 200a to perform the beam management will now be disclosed.

In some aspects the beam management is for determining a transmit beam. The first radio transceiver device 200a is then configured to perform (optional) step S106aa:

S106aa: The first radio transceiver device 200a transmits, towards the second radio transceiver devices 200b, at least one occurrence of a reference signal in each of the beams in the first set of beams 420.

It is assumed that the second radio transceiver device 200b reports back to the first radio transceiver device 200a at least the beam having been received with highest received power. Hence in this embodiment the first radio transceiver device 200a is then further configured to perform (optional) step S106ab:

S106ab: The first radio transceiver device 200a receives, from each of the second radio transceiver devices 200b, a respective first report identifying at least that beam in the first set of beams 420 having been received with highest received power at that second radio transceiver device.

Steps S106aa and S106ab are preferably performed as part of step S106.

In scenarios where the identified beam in the first set of beams 420 covers at least two beams in the second set of beams 450 also a second phase of the beam management is performed. Hence, according to this embodiment the first radio transceiver device 200a is configured to perform (optional) step S106ac:

S106ac: The first radio transceiver device 200a transmits, towards at least some of the second radio transceiver devices 200b, at least one occurrence of the reference signal in each of those beams in the second set of beams 450 that are covered by the beam in the first set of beams 420 being identified in the respective first reports.

It is assumed that the second radio transceiver device 200b reports back to the first radio transceiver device 200a at least the beam having been received with highest received power. Hence in this embodiment the first radio transceiver device 200a is then further configured to perform (optional) step S106ad:

S106ad: The first radio transceiver device 200a receives, from the at least some of the second radio transceiver devices 200b, a respective second report identifying at least that beam in the second set of beams 450 having been received with highest received power at that second radio transceiver device. That beam in the second set of beams 450 then defines the transmit beam.

In scenarios where the identified beam in the first set of beams 420 covers only a single beam in the second set of beams 450 the second phase of the beam management (as defined by steps S106ac and S106ad) needs not to be performed. Particularly, according to an embodiment, when the identified beam in the first set of beams 420 having been received with highest received power at at least one of the second radio transceiver devices 200b covers only a single beam in the second set of beams 450, the identified beam defines the transmit beam.

The first radio transceiver device 200a can then use the transmit beam during subsequent transmission of data and/or control signalling towards the second radio transceiver device 200b.

In some aspects the beam management is for determining a receive beam. The first radio transceiver device 200a might then be configured to perform (optional) step S106ba:

S106ba: The first radio transceiver device 200a receives, from one of the second radio transceiver devices 200b, at least one occurrence of a reference signal in each of the beams in the first set of beams 420.

Step S106ba is preferably performed as part of step S106.

The first radio transceiver device 200a then determines in which of the beams in the first set of beams 420 the reference signal was received with highest received power.

In scenarios where the identified beam in the first set of beams 420 covers at least two beams in the second set of beams 450 also a second phase of the beam management is performed. Hence, according to this embodiment the first radio transceiver device 200a is configured to perform (optional) step S106bb:

S106bb: The first radio transceiver device 200a receives from this one of the second radio transceiver devices 200b (i.e., the same second radio transceiver device 200b as in step S106ba), at least one occurrence of the reference signal in each of those beams in the second set of beams 450 that are covered by the beam in the first set of beams 420 being identified in the first report.

In scenarios where the identified beam in the first set of beams 420 covers only a single beam in the second set of beams 450 the second phase of the beam management (as defined by step S106bb) needs not to be performed. Particularly, according to an embodiment, when the identified beam in the first set of beams 420 having been received with highest received power covers only a single beam in the second set of beams 450. The identified beam then defines the receive beam.

The first radio transceiver device 200a can then use the receive beam during subsequent reception of data and/or control signalling from the second radio transceiver device 200b.

Further, in some aspects, regardless if the beam management is for determining a transmit beam or a receive beam, the thus defined transmit beam or receive beam might then be used for both transmission of signals to the second radio transceiver device 200b and reception of signals from the second radio transceiver device 200b.

Figure 8:
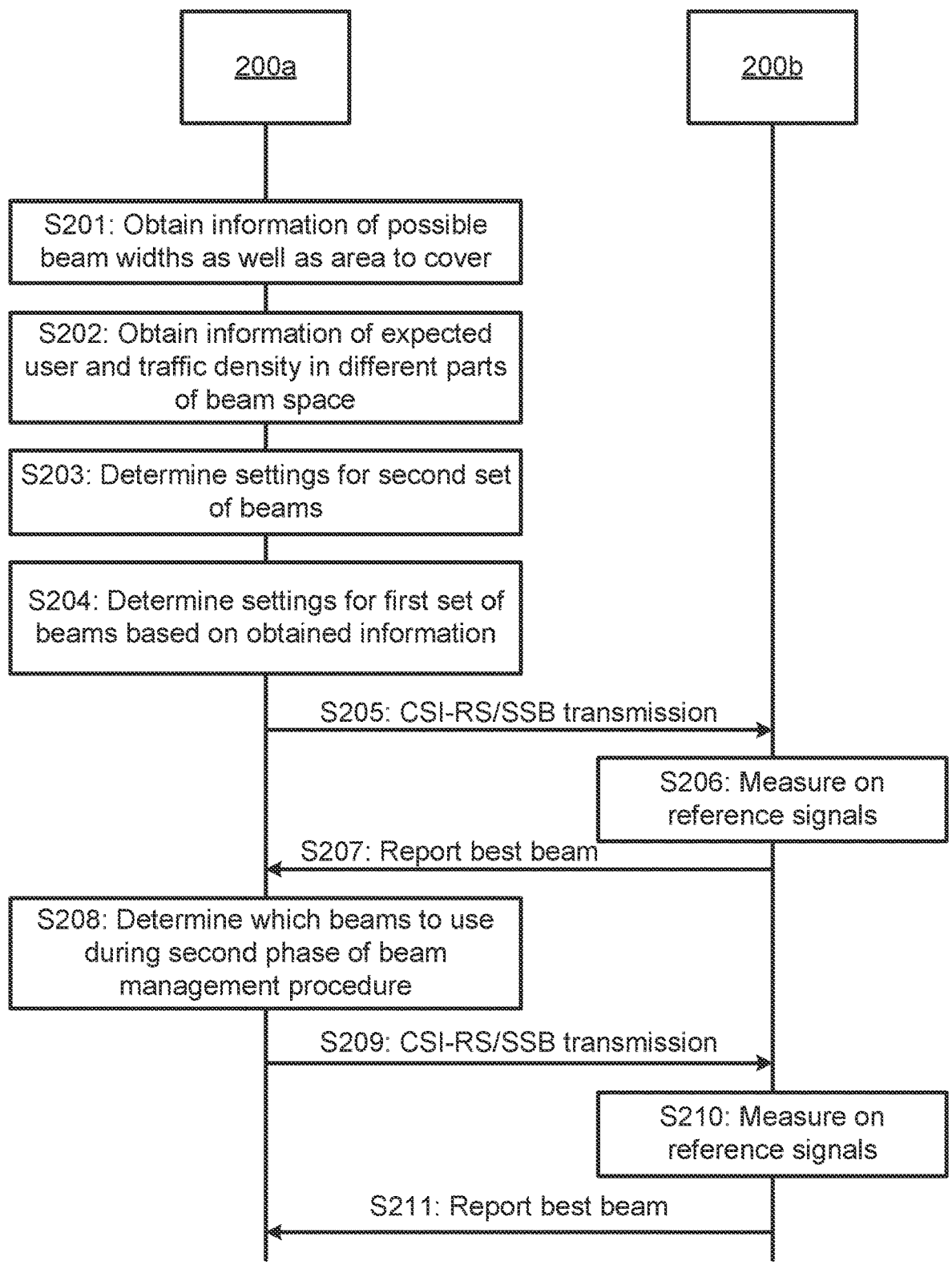
FIG. 8 is a signalling diagram of a method according to an embodiment.

One particular embodiment of a method for determining beam settings for beam management (and performing the beam management) based on at least some of the above disclosed embodiment will now be disclosed with reference to the signalling diagram of FIG. 8.

S201: The first radio transceiver device 200a obtains information of possible beam widths that can be generated at the TRP 300a.

S202: The first radio transceiver device 200a obtains information regarding expected user density and traffic density in different parts of the beam space, where the beam space is defined by the network coverage region 410 of the first radio transceiver device 200a in which the beam management is to be performed.

S203: The first radio transceiver device 200a determines settings for the second (narrow) set of beams 450 intended for use in the second phase of the beam management procedure, and for later data and/or control signalling. The settings are determined such that the second set of beams 450 are distributed in such a fashion (in angular domain) to cover the whole network coverage region 410 intended to be served. This is similar to generation a codebook of all possible transmit beams that may be needed when serving users.

S204: The first radio transceiver device 200a determines beam settings for the first set of beams 420 to be used for the first phase of the beam management procedure, for example during a periodic TX beam sweep, based on the information gathered in step S202.

S205: The first radio transceiver device 200a transmits reference signals (such as CSI-RS or SSB) in the first phase of the beam management procedure using the first set of beams 420.

S206: The second radio transceiver device 200b measures power on the received reference signals.

S207: The second radio transceiver device 200b signals back to the first radio transceiver device 200a at least the beam in the first set of beams 420 having been received with highest received power.

S208: The first radio transceiver device 200a selects which beams in the second set of beams 450 to use during the second phase of the beam management procedure based on the report received from the second radio transceiver device 200b.

S209: The first radio transceiver device 200a transmits reference signals in the second phase of the beam management procedure using the second set of beams 450. The reference signal is only transmitted in those beams in the second set of beams that correspond to the reported beam in the first set of beams 420 (i.e. the beam having been received with highest received power) in order to find the best narrow beam for the second radio transceiver device 200b.

S210: The second radio transceiver device 200b measures power on the received reference signals.

S110: The second radio transceiver device 200b signals back to the first radio transceiver device 200a at least the beam in the second set of beams 450 having been received with highest received power.

The reported beam in the second set of beams 450 can then be used by the first radio transceiver device 200a for subsequent data and/or control signalling towards the second radio transceiver device 200b.

It is noted that although the beam management has been described as comprising a first phase and an optional second phase (wherein whether or not to perform the second phase depends on the amount of beams in the second set of beams 450 covered by the beam in the first set of beams 420 selected during the first phase) the beam management can be extended to comprise also a third phase where even more narrow beams than in the second set of beams 450 are evaluated for the beam in the second set of beams 450 selected during the second phase, and so on.

Figure 9:
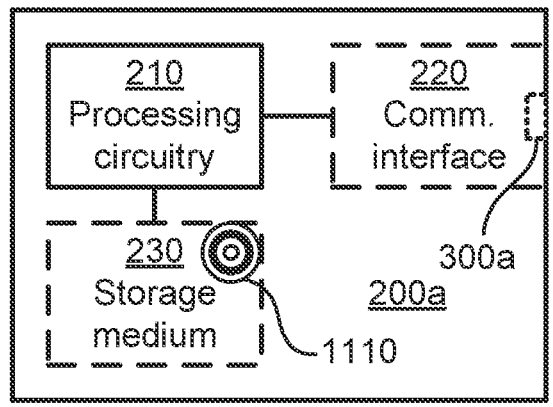
FIG. 9 is a schematic diagram showing functional units of a radio transceiver device according to an embodiment.

FIG. 9 schematically illustrates, in terms of a number of functional units, the components of a radio transceiver device 200a according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1110 (as in FIG. 11), e.g. in the form of a storage medium 230. The processing circuitry 210 may further be provided as at least one application specific integrated circuit (ASIC), or field programmable gate array (FPGA).

Particularly, the processing circuitry 210 is configured to cause the radio transceiver device 200a to perform a set of operations, or steps, as disclosed above. For example, the storage medium 230 may store the set of operations, and the processing circuitry 210 may be configured to retrieve the set of operations from the storage medium 230 to cause the radio transceiver device 200a to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The radio transceiver device 200a may further comprise a communications interface 220 at least configured for communications with other radio transceiver devices 200b. As such the communications interface 220 may comprise one or more transmitters and receivers, comprising analogue and digital components.

Signals, such as reference signals as well as data and control signals, could be transmitted from, and received by, a TRP 300a of the radio transceiver device 200a. The TRP 300a could form an integral part of the radio transceiver device 200a or be physically separated from the radio transceiver device 200a. The communications interface 220 might thus optionally comprise the TRP 300a.

The processing circuitry 210 controls the general operation of the radio transceiver device 200a e.g. by sending data and control signals to the communications interface 220 and the storage medium 230, by receiving data and reports from the communications interface 220, and by retrieving data and instructions from the storage medium 230. Other components, as well as the related functionality, of the radio transceiver device 200a are omitted in order not to obscure the concepts presented herein.

Figure 10:
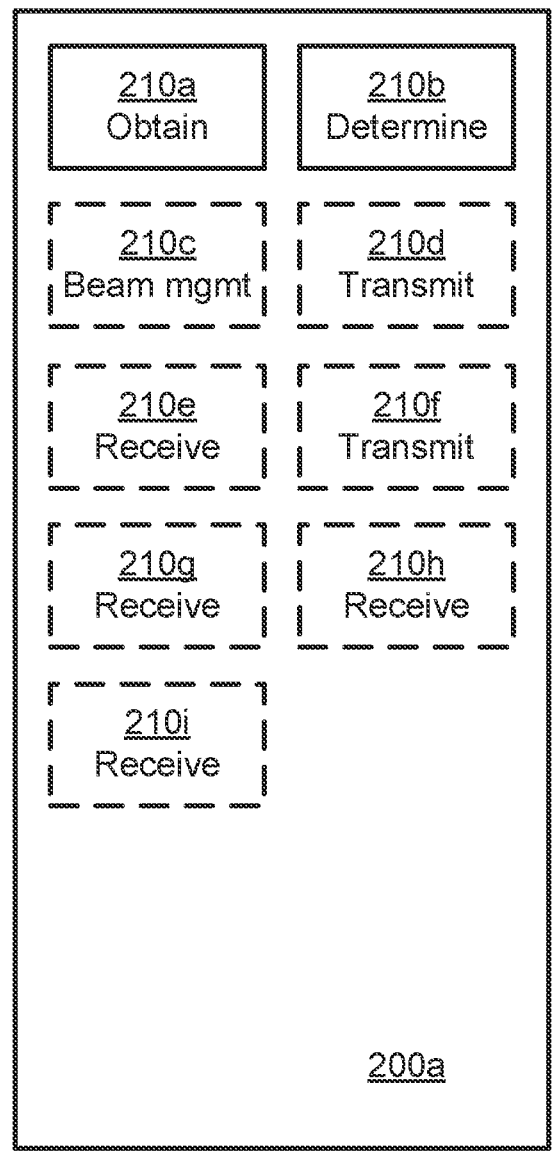
FIG. 10 is a schematic diagram showing functional modules of a radio transceiver device according to an embodiment.

FIG. 10 schematically illustrates, in terms of a number of functional modules, the components of a radio transceiver device 200a according to an embodiment. The radio transceiver device 200a of FIG. 10 comprises a number of functional modules; an obtain module 210a configured to perform step S102, and a determine module 210b configured to perform step S104.

The radio transceiver device 200a of FIG. 10 may further comprise a number of optional functional module 210s, such as any of a beam management module 210c configured to perform step S106, a transmit module 210d configured to perform step S106aa, a receive module 210e configured to perform step S106ab, a transmit module 210f configured to perform step S106ac, a receive module 210g configured to perform step S106ad, a receive module 210h configured to perform step S106ba, and a receive module 210i configured to perform step S106bb.

In general terms, each functional module 210a-210i may in one embodiment be implemented only in hardware and in another embodiment with the help of software, i.e., the latter embodiment having computer program instructions stored on the storage medium 230 which when run on the processing circuitry makes the radio transceiver device 200a perform the corresponding steps mentioned above in conjunction with FIG. 10. It should also be mentioned that even though the modules correspond to parts of a computer program, they do not need to be separate modules therein, but the way in which they are implemented in software is dependent on the programming language used. Preferably, one or more or all functional modules 210a-210i may be implemented by the processing circuitry 210, possibly in cooperation with the communications interface 220 and/or the storage medium 230. The processing circuitry 210 may thus be configured to from the storage medium 230 fetch instructions as provided by a functional module 210a-210i and to execute these instructions, thereby performing any steps as disclosed herein.

The radio transceiver device 200a may be provided as a standalone device or as a part of at least one further device. For example, the radio transceiver device 200a may be provided in a node of the radio access network or in a node of the core network. Alternatively, functionality of the radio transceiver device 200a may be distributed between at least two devices, or nodes. These at least two nodes, or devices, may either be part of the same network part (such as the radio access network or the core network) or may be spread between at least two such network parts.

Thus, a first portion of the instructions performed by the radio transceiver device 200a may be executed in a first device, and a second portion of the of the instructions performed by the radio transceiver device 200a may be executed in a second device; the herein disclosed embodiments are not limited to any particular number of devices on which the instructions performed by the radio transceiver device 200a may be executed. Hence, the methods according to the herein disclosed embodiments are suitable to be performed by a radio transceiver device 200a residing in a cloud computational environment. Therefore, although a single processing circuitry 210 is illustrated in FIG. 9 the processing circuitry 210 may be distributed among a plurality of devices, or nodes. The same applies to the functional modules 210a-210i of FIG. 10 and the computer program 1120 of FIG. 11 (see below).

Figure 11:
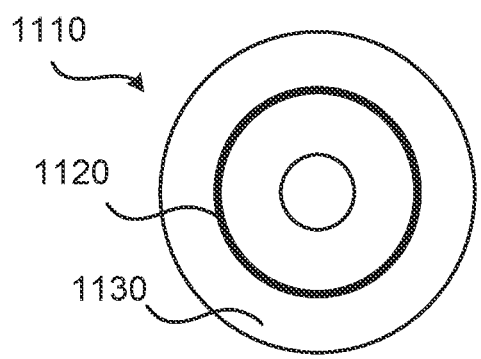
FIG. 11 shows one example of a computer program product comprising computer readable storage medium according to an embodiment.

FIG. 11 shows one example of a computer program product 1110 comprising computer readable storage medium 1130. On this computer readable storage medium 1130, a computer program 1120 can be stored, which computer program 1120 can cause the processing circuitry 210 and thereto operatively coupled entities and devices, such as the communications interface 220 and the storage medium 230, to execute methods according to embodiments described herein. The computer program 1120 and/or computer program product 1110 may thus provide means for performing any steps as herein disclosed.

In the example of FIG. 11, the computer program product 1110 is illustrated as an optical disc, such as a CD (compact disc) or a DVD (digital versatile disc) or a Blu-Ray disc. The computer program product 1110 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1120 is here schematically shown as a track on the depicted optical disk, the computer program 1120 can be stored in any way which is suitable for the computer program product 1110.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for determining beam settings for beam management, the method being performed by a first radio transceiver device, the method comprising:
   obtaining information about expected distribution of second radio transceiver devices in a network coverage region of the first radio transceiver device; and
   determining beam settings for a first set of beams such that a width of at least one beam included in the first set of beams is determined based on the obtained information about the expected distribution of the second radio transceiver devices in the network coverage region, wherein
   one or more beams included in the first set of beams is for selecting a subset of beams included in a second set of beams.

2. The method according to claim 1, wherein the beam settings for the first set of beams are determined such that beams included in the first set of beams are narrower in those parts of the network coverage region having higher expected distribution of second radio transceiver devices than in those parts of the network coverage region having lower expected distribution of second radio transceiver devices.

3. The method according to claim 1, wherein
   the expected distribution of the second radio transceiver devices in the network coverage region is determined according to collected statistics, and
   the statistics pertain to location information of the second radio transceiver devices in the network coverage region.

4. The method according to claim 3, wherein the location information is defined by those beams that have been used for communicating at least one of data and control signals with the second radio transceiver devices in the network coverage region.

5. The method according to claim 3, wherein the statistics are collected by logging with how many second radio transceiver devices each of the beams in the second set of beams has been used for communicating at least one of data and control signalling.

6. The method according to claim 1, wherein the information about expected distribution of the second radio transceiver devices is based on at least one of deployment information of the first radio transceiver device and infrastructure information of the infrastructure in which the first radio transceiver device is deployed.

7. The method according to claim 1, wherein, during the beam management, the first set of beams are to be used prior to the second set of beams.

8. The method according to claim 7, wherein the first set of beams is to be used for periodic beam management and the second set of beams is to be used for aperiodic beam management.

9. The method according to claim 1, further comprising:
   performing the beam management using the determined beam settings for the first set of beams.

10. The method according to claim 9, wherein
    the beam management is for determining a transmit beam, and
    the beam management is performed by:
    transmitting, towards the second radio transceiver devices, at least one occurrence of a reference signal in each of the beams in the first set of beams; and
    receiving, from each of the second radio transceiver devices, a respective first report identifying at least that beam in the first set of beams having been received with highest received power at that the second radio transceiver device.

11. The method according to claim 10, wherein performing the beam management further comprises:
transmitting, towards at least some of the second radio transceiver devices, at least one occurrence of the reference signal in each of those beams in the second set of beams that are covered by the beam in the first set of beams being identified in the respective first reports; and
receiving, from the at least some of the second radio transceiver devices, a respective second report identifying at least that beam in the second set of beams having been received with highest received power at that second radio transceiver device, wherein that beam in the second set of beams defines the transmit beam.

12. The method according to claim 9, wherein
the beam management is for determining a receive beam, and
the beam management is performed by:
receiving, from one of the second radio transceiver devices, at least one occurrence of a reference signal in each of the beams in the first set of beams.

13. The method according to claim 12, wherein performing the beam management further comprises:
receiving, from said one of the second radio transceiver devices, at least one occurrence of the reference signal in each of those beams in the second set of beams that are covered by a beam in the first set of beams being identified in a first report.

14. The method according to claim 1, wherein at least one, but less than all, of the beams in the first set of beams covers only a single beam in the second set of beams.

15. The method according to claim 1, wherein each of two beams in the first set of beams having same beam width covers a respective subset of the beams in the second set of beams, and wherein respective subsets of the beams in the second set of beams have mutually different number of beams.

16. The method according to claim 1, wherein at least two of the beams in the first set of beams cover one common beam in the second set of beams.

17. A radio transceiver device for determining beam settings for beam management, the radio transceiver device comprising processing circuitry, the processing circuitry being configured to cause the radio transceiver device to:
obtain information about expected distribution of second radio transceiver devices in a network coverage region of the first radio transceiver device; and
determine beam settings for a first set of beams such that a width of at least one beam included in the first set of beams is determined based on the obtained information about the expected distribution of the second radio transceiver devices in the network coverage region, wherein
one or more beams included in the first set of beams is for selecting a subset of beams included in a second set of beams.

18. A computer program product for determining beam settings for beam management, the computer program product comprising a non-transitory computer-readable medium storing a computer program comprising computer code which, when run on processing circuitry of a radio transceiver device, causes the radio transceiver device to:
obtain information about expected distribution of second radio transceiver devices in a network coverage region of the first radio transceiver device; and
determine beam settings for a first set of beams such that a width of at least one beam included in the first set of beams is determined based on the obtained information about the expected distribution of the second radio transceiver devices in the network coverage region, wherein
one or more beams included in the first set of beams is for selecting a subset of beams included in a second set of beams.

* * * * *

UNITED STATES PATENT AND TRADEMARK OFFICE
CERTIFICATE OF CORRECTION

| | | |
|---|---|---|
| PATENT NO. | : 11,778,488 B2 | Page 1 of 1 |
| APPLICATION NO. | : 18/094521 | |
| DATED | : October 3, 2023 | |
| INVENTOR(S) | : Nilsson et al. | |

It is certified that error appears in the above-identified patent and that said Letters Patent is hereby corrected as shown below:

In the Specification

In Column 1, Line 8, delete "2020," and insert -- 2020, now Pat. No. 11,553,356, --, therefor.

In Column 4, Line 46, delete "fifth (5G)" and insert -- fifth generation (5G) --, therefor.

Signed and Sealed this
Eighth Day of October, 2024

Katherine Kelly Vidal
*Director of the United States Patent and Trademark Office*